Jan. 14, 1969

R. J. PIOCH 3,421,793

TILT-DUMP VEHICLE WITH STABILIZING MEANS

Filed June 1, 1967

INVENTOR.
Robert J. Pioch.
BY
Harness, Dickey & Pierce.
ATTORNEYS.

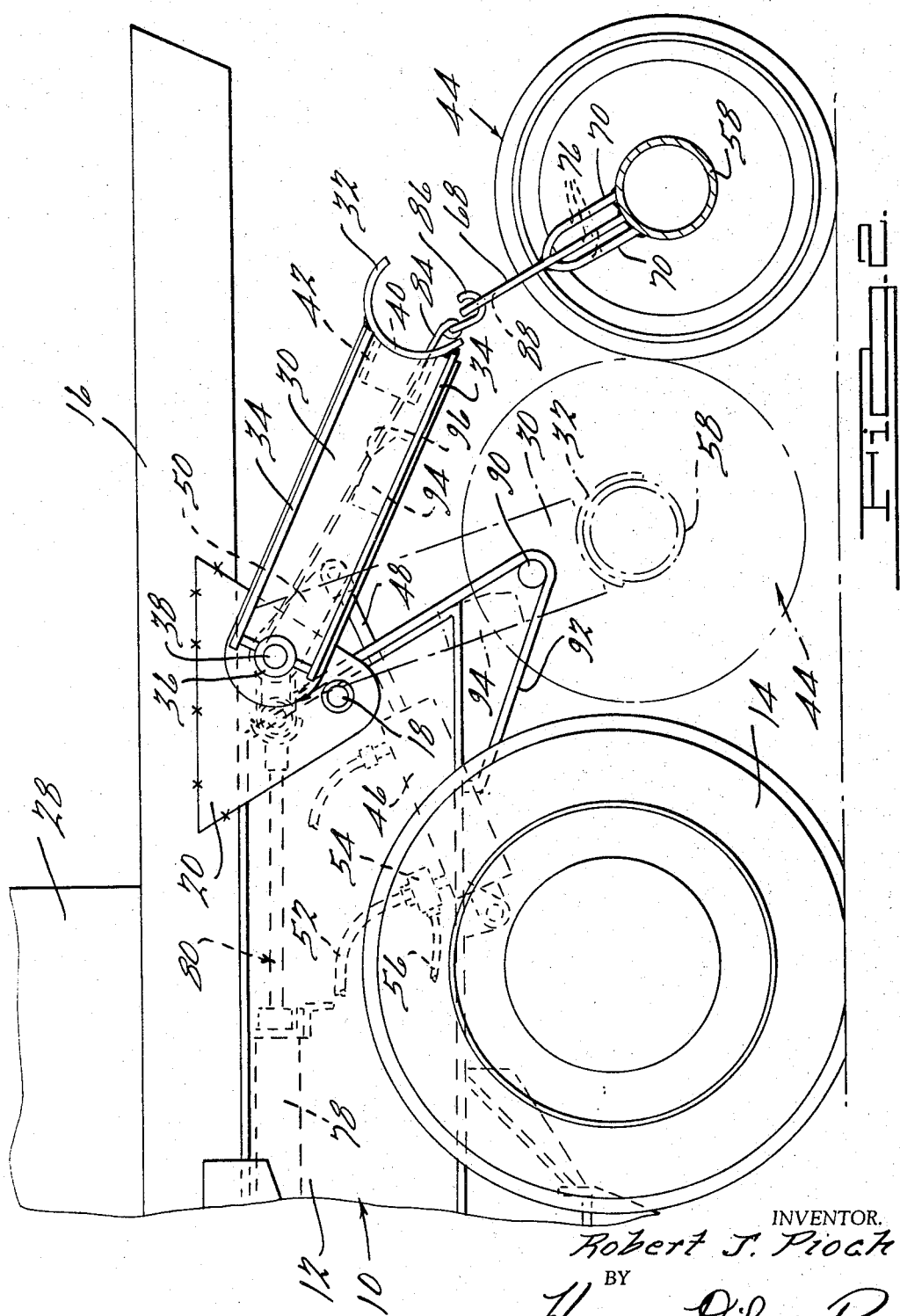

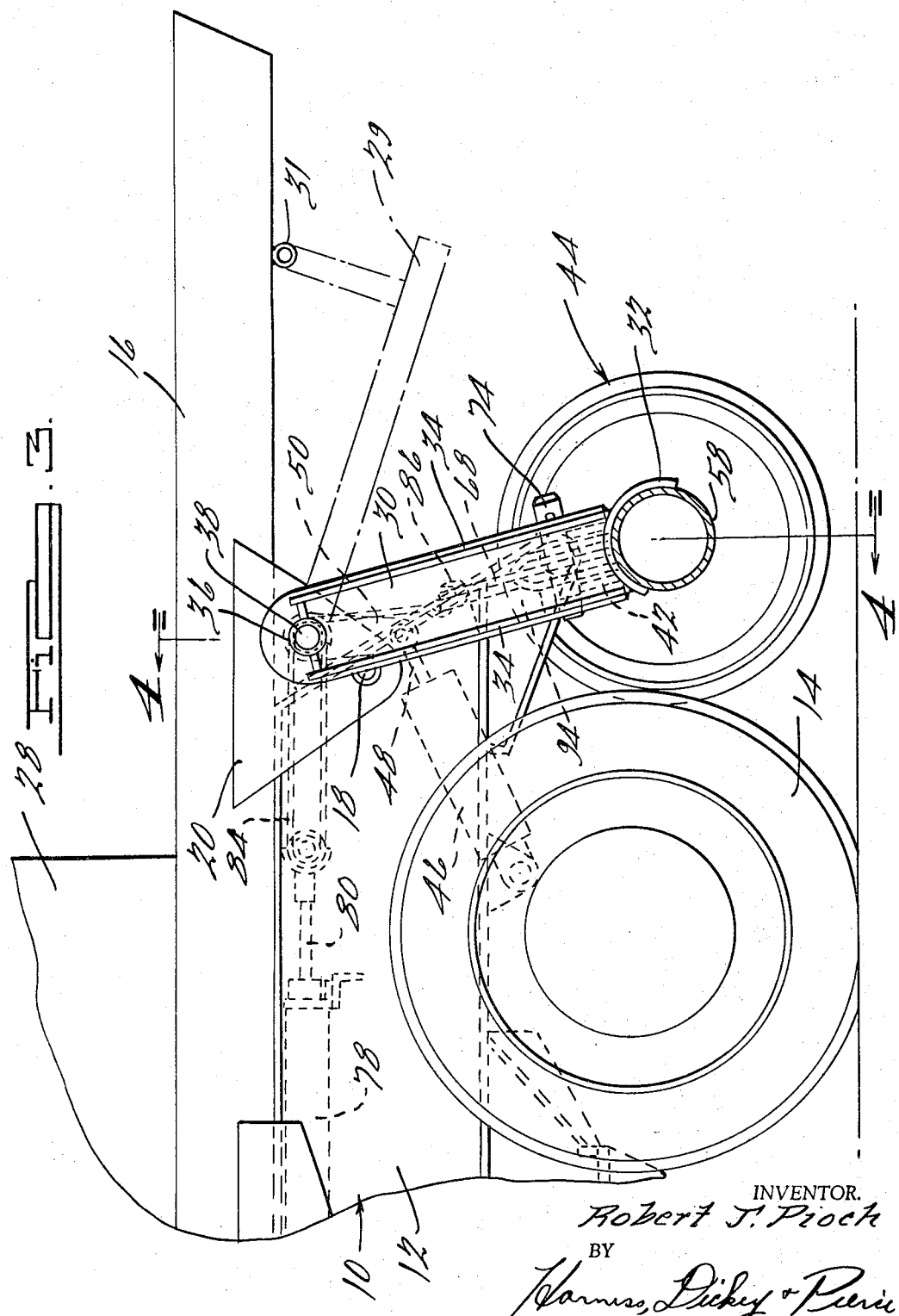

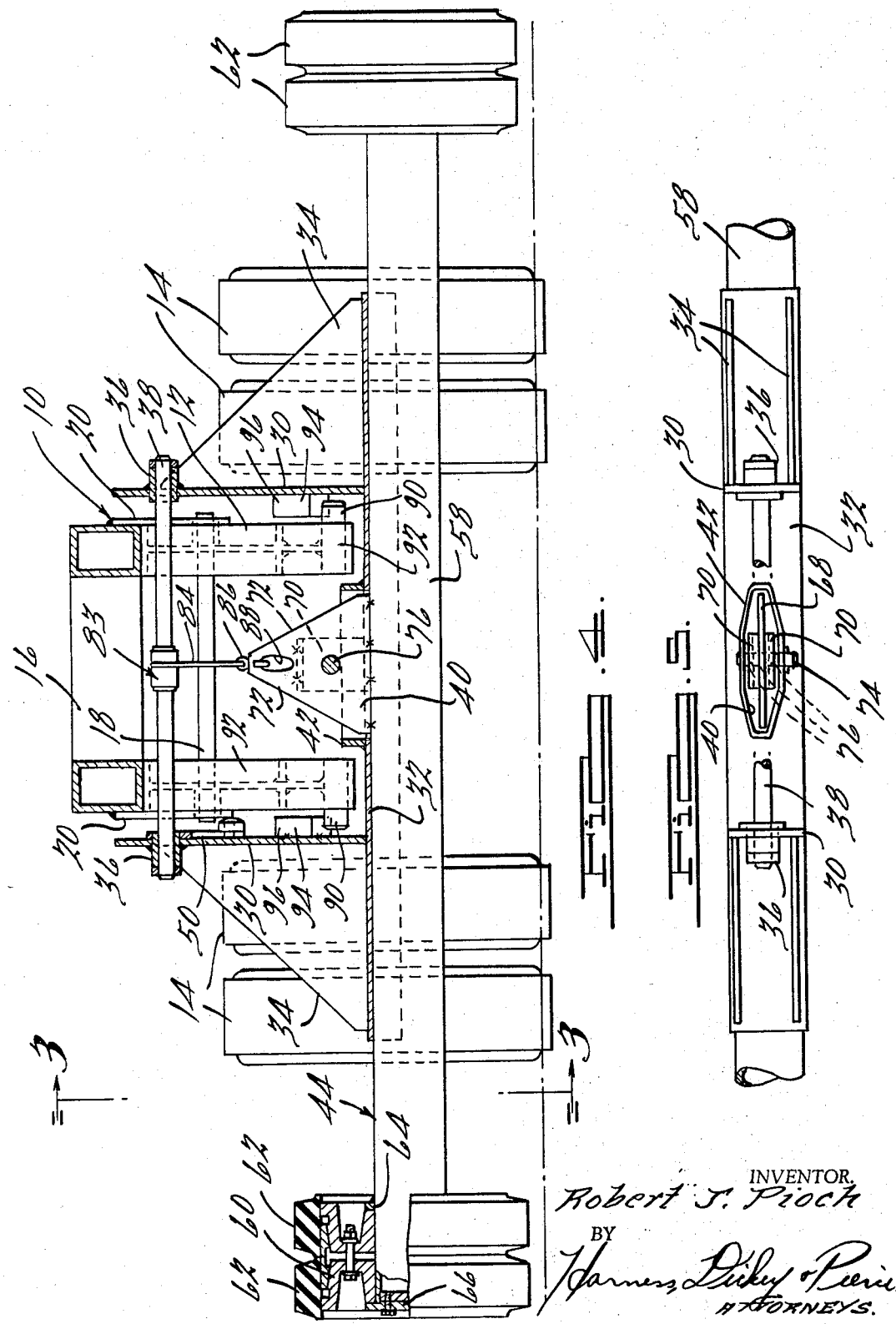

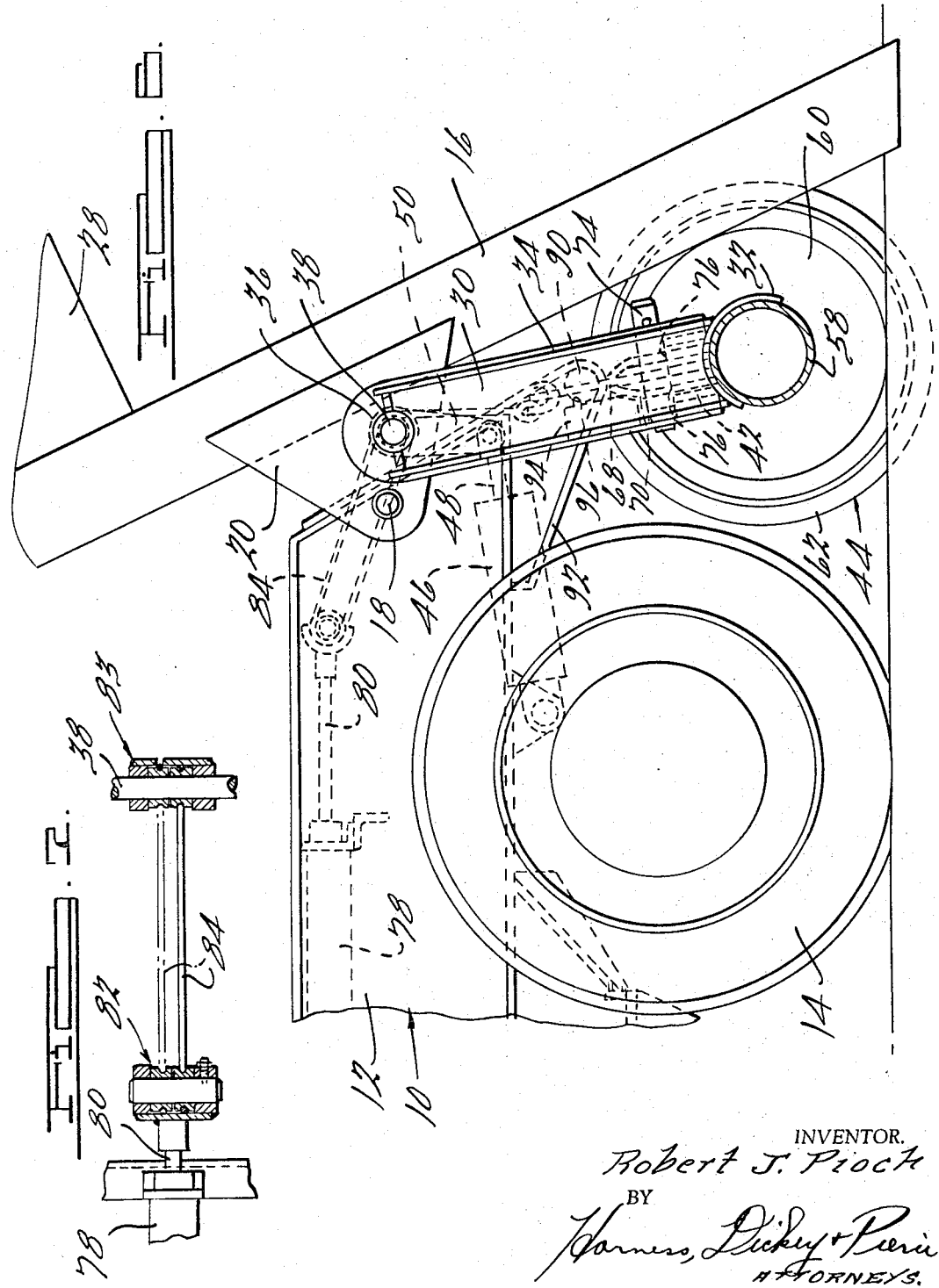

United States Patent Office 3,421,793
Patented Jan. 14, 1969

3,421,793
TILT-DUMP VEHICLE WITH STABILIZING MEANS
Robert J. Pioch, 116 1st St., Jackson, Mich. 49201
Filed June 1, 1967, Ser. No. 642,862
U.S. Cl. 298—17     10 Claims
Int. Cl. B60p 1/04; B60p 1/28

ABSTRACT OF THE DISCLOSURE

A combination stabilizer assembly for tilt-bed type vehicles which is selectively movable from a storage or retracted position in which it comprises a rear vehicle bumper to an operative position in which it is attachable to an auxiliary stabilizing member which extends transversely of the vehicle and beyond the fixed wheel tread thereof for increasing the lateral stability of the vehicle during periods when the load on the tilt bed is in a raised or dumping position.

Background of the invention

States and municipalities have enacted regulations governing the maximum width of vehicles traversing their streets and highways. These regulations dictate the maximum tread of the wheels of vehicles such as trucks and which, in turn, is influential in establishing the normal lateral stability of such vehicles. While the lateral stability of such vehicles is ordinarily satisfactory on hard surfaced pavements, difficulties have been encountered in some instances particularly with dump-type vehicles when they are utilized in "off-road" hauling or dumping operations during which terrain is encountered providing inadequate or nonuniform support to the wheels of the vehicle. This problem becomes particularly pronounced in heavily laden trucks of the tilt-bed type when the load is in an elevated position as during a dumping operation.

Various techniques have heretofore been used or proposed for use for increasing the lateral stability of such tilt-bed vehicles, including the manual bracing or shoring of the vehicle prior to undergoing a dumping operation, or by incorporating extendable pads or braces upon a vehicle which extend laterally thereof, and are adapted to contact the surrounding terrain, inhibiting tilting of the vehicle about its longitudinal axis. The various techniques heretofore known have not met with widespread acceptance, either due to the inadequacy of the support provided thereby, or by the substantial increase in the weight and complexity of vehicles to accommodate such stabilizing equipment. Stabilizing devices of the types heretofore known which are directly attached to the vehicle have, in many instances, been found to substantially reduce the road clearance of the vehicle, and the increased weight attending the installation of such equipment has resulted in a corresponding decrease in the useful load which the vehicle can carry. There has, accordingly, been a heretofore long-felt, unfilled need for a stabilizing assembly for tilt-bed type vehicles which does not materially add to the weight of the chassis, which is of simple and versatile construction and operation, and which is effective to substantially increase the lateral stability of such vehicles.

Summary of the invention

The advantages and benefits of the present invention are achieved by a stabilizing assembly including a supporting section carried by the vehicle which normally is in a retracted or storage position and which is readily movable from that position to an operative position in which it is adapted to be coupled to an elongated transversely extending stabilizing member, the ends of which project substantially beyond the normal tread of the vehicle. The stabilizing member in the preferred embodiment comprises a dolly including a transversely extending axle having a wheel rotatably mounted on each end thereof. Suitable latching means are provided for removably coupling the dolly to the supporting arm and the dolly as such, is adapted to remain at a dumping location at which it is readily accessible for use by other vehicles similarly equipped. The supporting section of the stabilizer assembly is preferably mounted on the vehicle so that when it is disposed in the retracted or storage position, it serves the function of the rear bumper of the vehicle eliminating the need for a conventional bumper which constitutes a further reduction in the net added weight contributed by the stabilizer.

Description of the drawings

The foregoing and other objects and advantages of the present invention will become apparent upon a reading of the following description, taken in conjunction with the accompanying drawings, wherein:

FIGURE 2 is a magnified fragmentary side elevational view of the rear end of the vehicle illustrating the attachment of the dolly to the supporting assembly on the vehicle;

FIGURE 3 is a longitudinal sectional view of the stabilizer assembly as shown in FIGURE 4 and taken along the line 3—3 thereof;

FIGURE 4 is a transverse sectional view of the stabilizer assembly shown in FIGURE 3 and taken substantially along the line 4—4 thereof;

FIGURE 5 is a fragmentary plan view of the center axle portion of the dolly;

FIGURE 6 is a fragmentary side elevational view illustrating the position of the stabilizer assembly when the tilt-bed has been raised to a dumping position, and FIGURE 7 is a fragmentary plan view of the power source and multiplier means for moving the auxiliary dolly into engagement with the supporting assembly.

Description of the preferred embodiments

Figure 1:
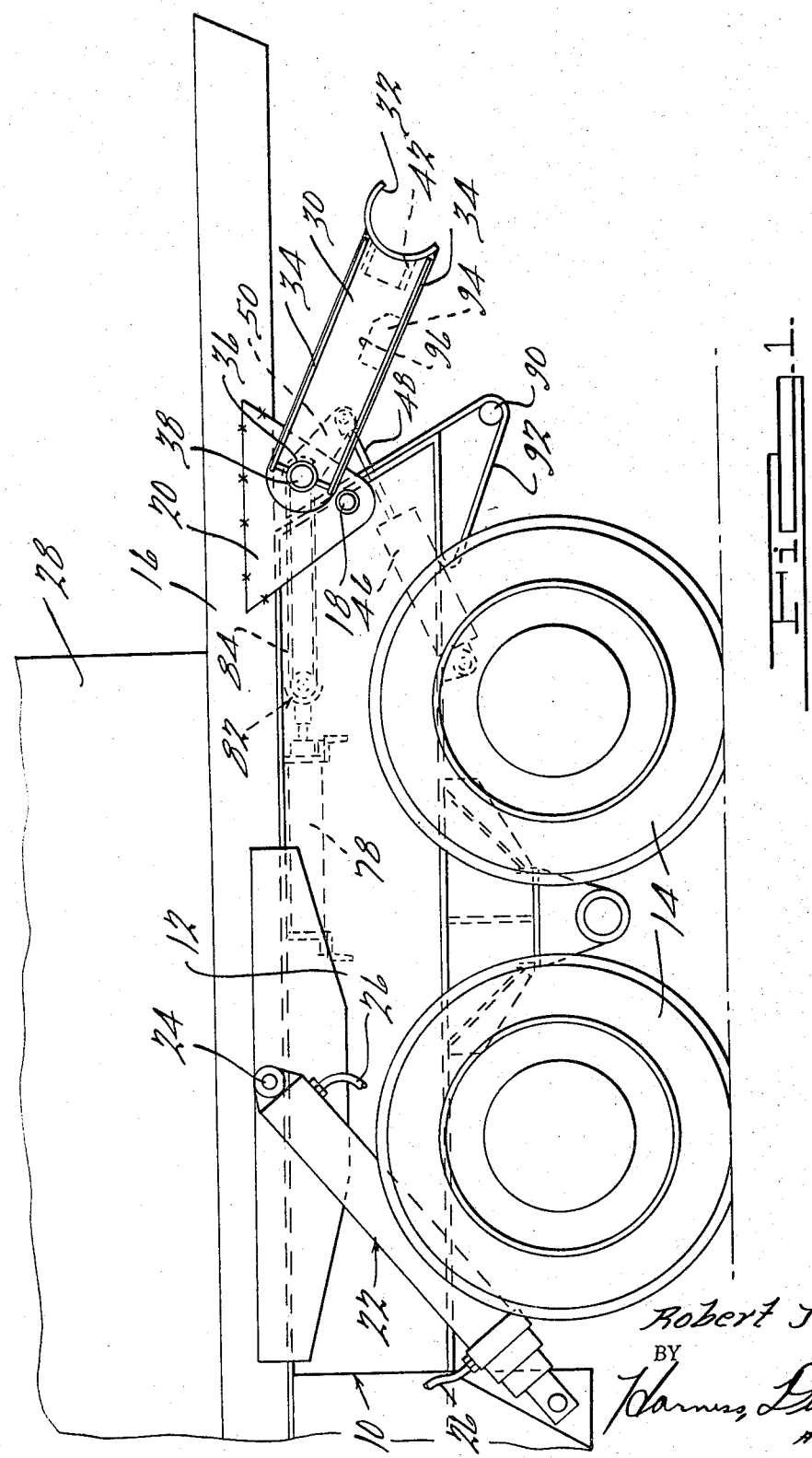
FIGURE 1 is a fragmentary side elevational view of a tilt-bed truck of the general type to which the present invention is applicable and with the supporting portion of the stabilizer assembly carried by the vehicle disposed in the retracted position.

Referring now in detail to the drawings and as may be best seen in FIGURE 1, a typical vehicle is illustrated of the general type to which the present invention is applicable, which consists of a chassis 10 including a transportable or first frame 12 to the underside of which the rear drive wheels 14 of the vehicle are attached and are of a fixed tread or lateral spacing. A second or tiltable frame 16 is pivotally secured to the rearward portion of the transportable frame 12 by means of a transverse shaft 18 extending between the sides of the transportable frame 12 and wherein the projecting ends thereof are journaled in bores formed in a depending ear 20 affixed to each of the side rails of the tiltable frame 16. Tilting movement of the second frame 16 to and from a lowered position as shown in FIGURE 1, to a raised position as shown in FIGURE 6, can be achieved by either one of a variety of techniques well known in the art such as a double acting fluid actuated lift cylinder 22 shown in FIGURE 1 having the rod end thereof affixed to the chassis and the blank end thereof pivotally connected by means of pin 24 to the second or tiltable frame. Pressurized fluid such as hydraulic fluid is supplied through supply lines 26 to the lift cylinder 22 from a central source disposed in the engine compartment of the vehicle or supplied by an auxiliary unit on the chassis.

The bed or upper surface of the tiltable frame 16 is adapted to receive a load generally indicated at 28 in FIGURES 1, 2 and 3, which may either be in the form of a transportable container filled with material to be discharged, a container affixed directly to the tiltable frame 16 or, alternatively, a conventional dump body mounted on the tiltable frame of the type well known in the art. In either event, the contents or load 28 on the tiltable frame is discharged at the vehicle's destination by lifting the tiltable frame to the raised position facilitating a gravitational discharge of the load rearwardly of the vehicle. During movement of the load to the raised position and while in that position the center of gravity of the vehicle correspondingly rises wherein the lateral stability of the vehicle is impaired particularly when the drive wheels 14 are supported on soft terrain. The stabilizer assembly has as its primary objective the improvement of the lateral stability of the vehicle by providing stabilizing points of contact with the ground spaced laterally of the normal tread of the vehicle without reducing or substantially impairing its mobility as is required during a dumping action.

The supporting section of the stabilizer assembly, as shown in the drawings, is carried by the vehicle chassis and during periods of nonuse is in an operative or retracted position as illustrated in FIGURE 1. In this position, and in accordance with a preferred embodiment of the present invention, the supporting assembly comprises a rear bumper of the vehicle dispensing with the necessity of incorporating a conventional bumper. A detachable bumper 29 is fragmentarily shown in phantom in FIGURE 3 in an installed position with the rearward end thereof adapted to be removably secured to a cleat 31 affixed to the underside of the tiltable frame 16 and its forward end adapted to be secured to the ears 20 at a point common to that it which the supporting section is mounted providing for quick and simple interchangeability thereof. The supporting section, as best seen in FIGURES 2 and 4, comprises a pair of laterally spaced arms 30 which are secured at their lower ends to an arcuate mounting plate 32 extending transversely of the vehicle to a width not substantially exceeding that of the vehicle tread. The arms 30 and arcuate member 32 are further rigidified by means of triangular brackets 34 which are welded or otherwise rigidly affixed thereto. A tubular sleeve 36 is rigidly affixed to the outer face of each of the arms 30 and are disposed in rotating support about a transverse shaft 38 which extends between and is affixed to the ears 20 depending from the tiltable frame 16. As will be noted, the shaft 38 about which pivoting movement of the arms 30 and the arcuate member 32 occurs, is spaced from the pivoting axis as defined by the shaft 18 about which the tiltable frame pivots between the raised and lowered positions.

An aperture 40 is provided at substantially the center of the arcuate member 22 and to the convex side of which an elongated collar 42 is affixed which serves to guide and align an auxiliary stabilizing member or dolly 44 during the attachment thereof.

During periods of nonuse, the supporting section of the stabilizer assembly is retained in the inoperative or retracted position as best seen in FIGURES 1 and 2, by means of a double acting fluid actuated cylinder 46 having its blank end attached to the vehicle chassis and a piston rod 48 thereof pivotally connected to a bellcrank 50 affixed to one of the arms 30. During periods of nonuse, as during operation of the vehicle, a positive pressure is maintained within the cylinder 46 maintaining its piston rod 48 in a projected position which prevents downward gravitational movement of the supporting section from the inoperative position in which it serves as a rear bumper to an operative position spaced downwardly and angularly therefrom. The pressurized fluid is applied to the blank end of the cylinder 46, as best seen in FIGURE 2, by means of a supply conduit 52 which is connected by means of a pressure relief valve 54 to the blank end of the cylinder. A suitable return conduit 56 is connected to the pressure relief valve 54 for returning hydraulic fluid back to the sump for a purpose subsequently to be described.

The dolly 44 which comprises a wheeled auxiliary axle is readily attachable to the supporting assembly at the location and prior to the dumping operation. The dolly remains at the dumping location and is quickly and simply attacted to similarly equipped vehicles prior to the dumping operation and thereafter is simply disconnected and left at the dumping site for use by the next vehicle.

As may be best seen in FIGURES 2, 4 and 5, the dolly comprises a tubular axle 58 which extends for a length substantially beyond the tread of the drive wheels 14 of the vehicle, as shown in FIGURE 4. In a preferred embodiment, the diameter of the axle 58 corresponds to the diameter of the arcuate surface of the supporting member 32 providing a firm mutual seating relationship therebetween around substantially 180° of the periphery of the axle. A pair of wheels 60 having solid rubber tires 62 are rotatably mounted on each end of the axle 58 and are retained in appropriate axial alignment by means of an annular flange 64 and a coverplate 66 overlying the lateral edges of the wheels 60.

Appropriate transverse alignment of the dolly 44 relative to the supporting section of the stabilizer assembly is achieved by means of a triangularly shaped tongue 68 affixed to and projecting upwardly from the axle 58 to the side surfaces of which cam plates 70 are rigidly secured. The coaction of the side edges 72 of the tongue 68 with the edges of the aperture 40 in the arcuate member 32 and the collar 42 affixed therearound, as best seen in FIGURES 4 and 5, serves to appropriately transversely align the dolly relative to the supporting assembly during installation. In addition, the arcuate configuration of the peripheral surfaces of the cam plates 70 coacting with the inner surface of the elongated collar 42 serves to appropriately axially align the dolly with the supporting assembly. In the assembled position, as shown in FIGURES 4, 5 and 6, a locking pin 74 can be removably inserted through a series of axially aligned apertures 76 formed in the tongue and adjacent cam plates whereby the periphery of the locking pin is disposed in abutting contact against the upper edge of the elongated collar 42. The locking pin 74, accordingly, prevent inadvertent outward movement of the tongue relative to the arcuate member 32 until such time that detachment of the dolly 44 is desired.

At the time of attachment of the dolly to the supporting assembly, the vehicle is driven to a position in which the dolly is disposed adjacent to the rear wheels of the vehicle such as illustrated in solid lines in FIGURE 2. Alternatively, the dolly can readily be transported such as by means of a fork lift truck to a position rearwardly of the vehicle. Movement of the dolly from a remote position to a position in engagement with the supporting member is preferably achieved by the use of a power source mounted on the vehicle chassis including multiplier means for effecting a movement of the axle 58 of the dolly into firm engagement with the arcuate supporting member 32. In the exemplary embodiment as illustrated in FIGURES 2 and 7, the power source comprises a double acting fluid actuated cylinder 78 having a piston rod 80. A pulley 82 is affixed to the end of the rod 80 around which a flexible element such as a cable 84 is trained and extends around a second pulley 83 rotatably supported on the pivot shaft 38 having one end thereof affixed to the second pulley 83. The other end of the cable 84 is adapted to extend over the pulley 83 and then downwardly between the arms 80 through the elongated collar 42 and out through the aperture 40 in the surface of the arcuate support 32. A suitable engaging hook 86 is affixed to the end of the cable 84 which is adapted to be positioned in engaging relationship with an elongated aperture 88 formed in the upper edge of the tongue 68 as shown in FIGURES 2 and 4. Four strands of a ¼″ cable extending between the pulleys 82 and 83 and an eighteen inch stroke of the cylinder 78 provides a six foot length of cable for attachment to the dolly 44.

In accordance with this arrangement, movement of the piston rod 80 to the left by the cylinder 78, as viewed in FIGURES 2 and 7, provides for a four-fold multiplication of the travel distance whereupon the dolly 44 is moved from the position as shown in solid lines to the position as shown in phantom wherein the periphery of the axle 58 is firmly seated within the arcuate surface of the supporting member 32. During the course of the inward pulling force as applied by the cable and hook, the weight of the dolly effects a downward pivoting movement of the arms 30 from the position as shown in solid lines in FIGURE 2 to an operative position as shown in phantom. Restricted downward movement of the arms 30 is provided by the pressure relief valve 54 on the cylinder 46, which is set to a pressure such that the inward force applied to the piston rod 48 by the weight of the dolly is sufficient to permit a release of fluid from the blank end of the cylinder 46 and a return thereof through the return conduit 56. When the dolly attains the fully engaged position, the locking pin 74 is inserted through the apertures 76 in the cam plates 70 and tongue 68 of the dolly, retaining the assembly in firm engagement.

With the dolly engaged to the supporting assembly in a position as illustrated in solid lines in FIGURE 3, the tire 62 on the wheels of the dolly are disposed in relative clearance relationship with respect to the ground on which the main wheels 14 of the vehicle are supported, facilitating simple movement of the vehicle to the dump site. On reaching the dump site, the lift cylinder 22 (FIGURE 1) is actuated, effecting an upward tilting movement of the tiltable frame 16 from the lowered position as shown in FIGURE 3 to the raised position as shown in FIGURE 6. During the tilting movement of the tiltable frame about its axis, as defined by the shaft 18, the supporting assembly, including the dolly 44 attached thereto, is moved downwardly through the concentric travel of the supporting shaft 38 around the axis of pivoting movement of the tiltable frame from the position as shown in FIGURE 4 to the position as shown in FIGURE 6. As shown in FIGURE 6, the tire 62 on the wheel 60 of the dolly is disposed slightly below the level of the main wheels 14, whereby firm lateral support of the vehicle is provided. The firm contact of the wheels of the dolly 44 with the ground will, to some extent, relieve the weight of the load disposed on the main wheels 14 which depends on the softness and weight bearing characteristics of the terrain.

In the specific embodiment as illustrated in FIGURE 6, the geometry of the stabilizer assembly is adapted for use on trailer-type trucks having a tiltable frame wherein the arms 30 are of a length such that the wheels of the dolly 44 will effect a partial shift of the load to a fifth wheel of the tractor, which in turn increases the load on the drive wheels of the tractor, thereby enhancing its traction. This latter aspect constitutes still a further advantage of the present invention since the increased traction of the drive wheels of the tractor is desirable in many instances when terrain is encountered which affords less than optimum traction. In vehicles of a unitary frame wherein the main wheels 14 also comprise the rear drive wheels of the vehicle, the geometry of the stabilizer assembly is preferably altered by a shortening of the length of the arms 30 so that only a minimal reduction in the load on the main drive wheels occurs, thereby maintaining adequate traction at the drive wheels. In this latter instance, the periphery of the tires 62 on the dolly when in the operative position, as shown in FIGURE 6, are disposed a lesser distance below the level of the main wheels 14 of the vehicle in comparison to the position as shown in the drawing.

With the tilt frame in the raised position as shown in FIGURE 6, the arms of the supporting assembly are retained in the operative position preventing inadvertent tilting movement thereof toward the retracted or stored position by means of coacting means on the arms and on the vehicle chassis. In the preferred embodiment, as illustrated in the drawings and as best seen in FIGURES 2 and 4, a pair of outwardly extending lugs 90 are affixed to V-shaped straps 92 attached to the underside and rearward portion of the transportable frame 12. The end portions of the lugs 90, as seen in FIGURE 4, project outwardly toward but in clearance relationship relative to the inner surfaces of the arms 30. A cam block 94 is rigidly affixed to the inner surface of each of the arms 30, which is adapted to be positioned with a rearward surface 96 thereof in bearing relationship against the forward peripheral surface of the lug 90. This locking relationship is achieved in response to the tilting movement of the tiltable frame about the shaft 18 and corresponding concentric movement of the pivot shaft 38 on which the arms 30 are mounted. As best seen in FIGURE 2, during the movement of the arm in response to the weight of the dolly 44 from the retracted position to the operative position spaced downwardly therefrom, the cam block 94 passes over and forwardly of the projecting end of the lug 90. During pivoting movement of the tiltable frame from the lowered position as shown in FIGURE 2 to the raised position as shown in FIGURE 6, the rotary concentric movement of the pivot shaft 38 effects a corresponding downward movement of the arms 30 and the cam blocks 94 thereon to a position in abutting and engaging contact against the forward surfaces of the lugs 90 in a position as shown in FIGURE 6. The lower edge of each cam block 94 is preferably chamfered to facilitate sliding engagement with the lugs 90. This interlocking engagement is released in response to movement of the tiltable frame 16 from the raised position to the lowered or horizontal position in which the lower edge of the cam block is again disposed in pivotable clearance relationship relative to the lugs 90.

What is claimed is:

1. In a tilt-bed vehicle having a fixed wheel tread and a chassis including a first frame and a second frame pivotally mounted adjacent to one end thereof on the first frame and means for moving the second frame to and from a lowered position and a raised position angularly spaced therefrom, the improvement comprising a stabilizer assembly for increasing the lateral stability of the vehicle when the second frame is raised, said assembly including an arm pivotally mounted on the vehicle chassis, means for pivoting said arm from a retracted position disposed beneath said second frame to an operative position angularly spaced downwardly therefrom, mounting means on the end portion of said arm, a detachable dolly adapted to be removably affixed to said mounting means and extending substantially transversely of the first and second frames beyond the wheel tread of the vehicle, and coacting means on the chassis and on said arm movable to a locking position for preventing pivoting movement of said arm from said operative position toward said retracted position.

2. The stabilizer assembly as defined in claim 1, wherein said arm is pivotally mounted on said second frame at a point spaced from the axis of pivoting movement of said second frame.

3. The stabilizer assembly as defined in claim 1, further including latching means for removably coupling said dolly to said mounting means.

4. The stabilizer assembly as defined in claim 1, further including means on the vehicle for engaging and moving said dolly from a remote position to an engaged position with said mounting means.

5. The stabilizer assembly as defined in claim 1, wherein said mounting means comprises a transversely extending arcuate member and said dolly comprises an axle having a wheel rotatably mounted on each end thereof, said axle disposed in supporting contact with said arcuate member when said dolly is removably affixed thereto.

6. The stabilizer assembly as defined in claim 1, wherein said mounting means comprises a transversely extending supporting member, said arm mounted at the rearward portion of the vehicle chassis and said supporting member when said arm is in said retracted position assuming the position of a rear vehicle bumper.

7. The stabilizing member as defined in claim 2, wherein said coacting means comprise first engaging means on said first frame and second engaging means on said arm movable to a locking position in response to movement of the second frame toward the raised position.

8. The stabilizer assembly as defined in claim 4, wherein said means on the vehicle for moving said dolly from a remote position to an engaged position with said mounting means comprises a double acting fluid actuated cylinder, multiplier means drivingly coupled to said cylinder, and a flexible element connected to said multiplier means and attachable to said dolly for pulling said dolly into engagement with said mounting means.

9. The stabilizer assembly as defined in claim 5, wherein said arcuate member incorporates guide means thereon for coacting with aligning means on said axle for accurately positioning said dolly relative to said mounting means when in the engaged position.

10. The stabilizer assembly as defined in claim 2, wherein said dolly incorporates a plurality of wheels thereon which are spaced upwardly of the surface on which the vehicle is supported when said second frame is in the lowered position and wherein said wheels on said dolly are movable downwardly to a position in firm contact with the surface in response to the upward tilting movement of said second frame and the arcuate movement of the pivoting axis of said arm about the axis of pivoting movement of said second frame.

References Cited

UNITED STATES PATENTS

| | | | |
|---|---|---|---|
| 2,189,052 | 2/1940 | Anthony | 214—65 |
| 2,439,085 | 4/1948 | Grzech | 298—17 |
| 2,777,529 | 1/1957 | Harbers | 298—17 X |
| 2,957,592 | 10/1960 | Thacker | 280—150 X |
| 2,999,721 | 9/1961 | Wood | 298—22 X |
| 3,107,021 | 10/1963 | Demster | 280—150.5 X |

FOREIGN PATENTS 1,292,231   3/1962   France.

RICHARD J. JOHNSON, *Primary Examiner.*

U.S. Cl. X.R.

280—150; 293—69